United States Patent Office 3,677,808
Patented July 18, 1972

3,677,808
METHOD OF MANUFACTURING CONSOLIDATED ARTICLES BY THE USE OF STEAM ATOMIZED WAX
John L. Sheridan, Longview, Wash., assignor to Weyerhaeuser Company, Tacoma, Wash.
No Drawing. Filed Oct. 21, 1970, Ser. No. 82,865
Int. Cl. B44d 1/09
U.S. Cl. 117—105.3       17 Claims

ABSTRACT OF THE DISCLOSURE

Steam is employed to atomize molten wax used as a waterproofing agent in the manufacture of composite, consolidated articles from particulate materials such as particulate wood and gypsum.

BACKGROUND OF THE INVENTION

This invention relates to the manufacture of moisture-resistant, composite, consolidated articles containing a preponderant amount of a particulate material such as particulate wood and gypsum. A wax-like substance is conventionally incorporated into the mixture from which these articles are produced in order to minimize moisture absorption by the finished article. In order to obtain a high degree of waterproofing efficiency, it is essential that the wax-like substance be incorporated in a finely dispersed state.

During the early stages of particleboard manufacture, the use of air to atomize molten wax was attempted. This technique, however, was found to be unsatisfactory because the air frequently caused the molten wax to solidify at or in the spray nozzles used to effect atomization, resulting in plugging of the nozzles or periodic dripping off of masses of wax which caused areas on the surface of the finished article to be discolored and incompatible with certain paints, adhesives and finishes. The use of water-wax emulsions avoids this solidification problem and has the additional advantage of providing appreciably better waterproofing efficiency than is obtained using air-atomized molten wax. Thus, although the cost of wax solids in emulsified form is often up to three times greater than that of solid wax, emulsions are usually more economical in the long run because of the increased waterproofing efficiency.

The use of such emulsions enjoys wide-spread acceptance in both the particleboard industry and the gypsum board industry. Such emulsions however ordinarily contain emulsifying agents which in some instances interfere with the ultimate potential sizing efficiency of the wax.

SUMMARY OF THE INVENTION

It has now been found that the wax solidification problems associated with the use of air-atomized molten wax are avoided and that improved waterproofing efficiency is obtained by using steam as the atomizing medium. It is thought that the increased efficiency results from the creation of smaller-sized droplets of wax, and it is hypothesized that a short-lived water-wax emulsion is formed. Also, it has been established that by the use of steam-atomized molten wax rather than conventional water-wax emulsions, the same amount of wax solids will provide finished particleboards exhibiting up to one-third less water absorption and one-fourth less thickness swell. Thus, not only is the wax used in the method of this invention considerably less expensive than wax in emulsion form, but also less total wax solids are needed to achieve the same waterproofing effect.

DETAILED DESCRIPTION OF THE INVENTION

The method of this invention can be used to advantage in any process for the manufacture of a moisture-resistant, composite, consolidated article from a mixture comprising a preponderant amount of particulate material and a dispersed, wax-like substance. Typical are processes for the manufacture of articles commonly known as "particleboard," "hardboard," "fiberboard" and "fiber-type particleboard," which are produced from particulate wood in the form of chips, shavings, splinters, sawdust, fibers, and mixtures thereof. In addition to particulate wood and a wax-like substance, such articles usually contain one or more of the following: resin binders such as phenol and urea resins, polymerization catalysts, dyes, pigments, preservatives against decay and insects, and fire retardant chemicals.

Other typical processes in which the method of this invention is useful are those for the manufacture of moisture-resistant articles containing gypsum.

The wax-like substances applied to particulate materials according to the method of this invention include petroleum waxes, synthetic waxes and natural waxes, such as refined waxes, scale waxes, paraffinic waxes, slack waxes, micro-crystalline waxes, petrolatum, polyolefin waxes and montan wax. Wax-like substances having melting points in the range of from about 120° to about 160° F. are in general the most easily handled and atomized, and are therefore preferred. Paraffinic waxes having melting points in this range are particularly prefered because of the high degree of waterproofing efficiency obtainable therewith. These waxes, however, need not be as highly refined as the waxes customarily used in manufacture of water-wax emulsions, it having been found that when sprayed onto wood particles by steam-atomization, paraffinic waxes containing up to about 20% oil differ very little in their waterproofing efficiencies. For paraffinic waxes containing substantially more than 20% oil, waterproofing efficiency becomes more closely a function of the amount of oil-free wax added to the particleboard furnish. The ability to use waxes containing substantial amounts of oil, i.e., from about 5% to about 20% by weight, is a distinct advantage of this invention since the cost of waxes ordinarily increases with the degree of refinement.

Apparatus useful for carrying out steam-atomization of molten wax, including means for melting, pumping and metering the wax, can be constructed from standard commercially available components. An advantage of the method of this invention is that molten wax can be pumped and metered using a variety of types of pumping and metering equipment. Inexpensive gear pumps of simple design and oval gear fluid flow meters are quite satisfactory. Most wax emulsions used heretofore cannot be handled in these types of pumping and metering units since the shearing action thereof can cause the emulsions to break, resulting in the formation of solid wax deposits which interfere with the operation of the pumping and metering units and obstruct wax transmission lines.

Spray nozzles generally useful for the air-atomization of molten materials can be used in the practice of this invention. Steam-jacketed spray nozzles are preferred. Tubing and piping through which the molten wax is transmitted to the nozzles should be equipped with heating means, such as steam-jacketing, electrical resistance heating elements or infrared heating elements, so as to prevent wax solidification therein, especially during periods when pumping of the wax is discontinued.

It should be noted that certain materials used to fabricate tubing, valves, fittings, etc., notably copper and brass, have a catalytic oxidizing effect on some petroleum products, especially waxes and oils. Since even partially oxidized waxes possess little waterproofing effectiveness, care should be exercised in the choice of equipment so as to prevent contact of the molten wax with such materials.

The following examples are provided by way of illustration and are not intended to be limiting of the invention in any way.

EXAMPLE 1

(a) Prepared wood chips having a moisture content of 5% to 10% are conveyed at a rate of 15,000 lbs. per hour (oven dry basis) through a conventional drum-type particleboard furnish blender equipped with a longitudinal shaft having paddles rotating in the range of from 600 to 1200 r.p.m. The paddles maintain the chips suspended in air. Liquid urea formaldehyde resin is sprayed onto the chips through spray nozzles situated near the end of the blender at which the chips are introduced. At the same end of the blender is situated a single internal-mix type, steam-jacketed, atomizing spray nozzle positioned to spray in the direction of and parallel to the flow of chips. Slack wax (Standard Oil of California "Chevron 136° Slack Wax") having a melting point of 136° F. and an oil content of about 19% is supplied to the spray nozzle in a molten state (200° F.) at a pressure of approximately 40 p.s.i.g. and at a rate of 37.5 lbs. per hour. Steam is supplied at 90 p.s.i.g. to the nozzle connection intended to receive an atomizing medium.

Thirty-two samples taken from 5/8-inch particleboard panels prepared from the resulting furnish are tested for edge and center thickness swell and water absorption after submersion in water for twenty-four hours (A.S.T.M. test method D-1037, Sections 69–75). The test results are as follows:

Percent edge swell, avg. _____ 10.3.
Percent center swell, avg. _____ 5.65.
Percent water absorption, avg. _____ 11.1 (S.D. 1.25).

(b) A particleboard furnish is prepared according to the foregoing procedure with the modification that a water-wax emulsion (a commercially available emulsion containing 47% by weight of a scale wax having a melting point of from 128° to 132° F.) is substituted for the molten wax and air is substituted for the steam. The emulsion is metered so as to provide 37.5 lbs. of wax solids per hour. Samples taken from particleboard panels produced from the resulting furnish are tested as described above. The test results are as follows:

Percent edge swell, avg. _____ 13.4.
Percent center swell, avg. _____ 7.38.
Percent water absorption, avg. ____ 16.4 (S.D. 2.64).

EXAMPLE 2

A mixture of 4.5 lbs. of paper pulp, 60 lbs. of perlite, 2 lbs. of sulfite lignin, 12 lbs. of core starch, 12.5 lbs. of water; a mixture of 1800 lbs. of calcined, particulate gypsum ($CaSO_4 \cdot \frac{1}{2}H_2O$) and 8.5 lbs. of fiber glass; and 1440 lbs. of water are combined and thoroughly mixed to form a thick slurry. 12.5 lbs. of a semi-refined paraffinic wax having an oil content of less than 1% and a melting point of about 130° F. is heated to 200° F. and then subjected to steam-atomization. The resulting spray is directed onto the surface of the slurry as the other ingredients are being combined and mixed. ½-inch gypsum board produced from the resulting slurry compares favorably in water-resistance and other properties to boards produced from identical slurries to which the wax is added in the form of a water-wax emulsion containing 49% solids.

What is claimed is:

1. In a process for the manufacture of a moisture-resistant, composite, consolidated article from an unconsolidated mixture comprising a preponderant amount of particulate material and a dispersed, wax-like substance, the improvement comprising dispersing said wax-like substance by subjecting same in a molten state to steam-atomization and causing the wax-like substance so dispersed to be incorporated into said unconsolidated mixture.

2. The process of claim 1 wherein said particulate material is wood.

3. The process of claim 2 wherein said wax-like substance is a paraffinic wax.

4. The process of claim 2 wherein said wax-like substance is a paraffinic wax having a melting point of from about 120° to about 160° F.

5. The process of claim 2 wherein said wax-like substance is a paraffinic wax having a melting point of from about 120° to about 160° F. and an oil content of up to about 20% by weight.

6. The process of claim 1 wherein said particulate material is gypsum.

7. In a process for the manufacture of a composite, consolidated article from an unconsolidated mixture comprising a preponderant amount of unconsolidated particulate wood and a dispersed, wax-like substance, the improvement comprising subjecting said wax-like substance in a molten state to steam-atomization and causing the resulting spray to contact said unconsolidated particulate wood.

8. The process of claim 7 wherein said wax-like substance is a paraffinic wax.

9. The process of claim 7 wherein said wax-like substance is a paraffinic wax having a melting point of from about 120° to about 160° F.

10. The process of claim 7 wherein said wax-like substance is a paraffinic wax having a melting point of from about 120° to about 160° F. and an oil content of up to about 20% by weight.

11. The process of claim 7 wherein said spray is contacted with said particulate wood while said particulate wood is suspended in air.

12. The process of claim 11 wherein said wax-like substance is a paraffinic wax.

13. The process of claim 11 wherein said wax-like substance is a paraffinic wax having a melting point of from about 120° to about 160° F.

14. The process of claim 11 wherein said wax-like substance is a paraffinic wax having a melting point of from about 120° to about 160° F. and an oil content of up to about 20% by weight.

15. In a process for the manufacture of a consolidated board-like article from an unconsolidated furnish comprising a preponderant amount of particulate wood in the form of chips, shavings, splinters, sawdust, fibers or mixtures thereof and a finely dispersed petroleum, synthetic or natural wax, the improvement comprising subjecting said wax while in a molten state to steam-atomization, causing the resulting spray to contact said particulate wood while said particulate wood is suspended in air, and thereafter forming a consolidated board-like article from said furnish.

16. The process of claim 15 wherein said wax is a paraffinic wax.

17. The process of claim 15 wherein said wax is a paraffinic wax having a melting point of from about 120° to about 160° F.

References Cited

UNITED STATES PATENTS

| | | | |
|---|---|---|---|
| 2,658,847 | 11/1953 | MacDonald | 264—121 |
| 3,328,188 | 6/1967 | Heberlein | 117—4 |
| 1,998,100 | 4/1935 | Shepherd et al. | 117—105.1 XR |
| 2,952,987 | 9/1960 | Clauson | 117—105.1 XR |
| 3,488,213 | 11/1970 | Bellato | 117—105.1 XR |

EDWARD G. WHITBY, Primary Examiner

U.S. Cl. X.R.

106—272; 117—121, 149; 161—235; 264—122